April 9, 1929.  J. NEWHOUSE  1,708,149
ANIMAL TRAP
Filed May 8, 1924
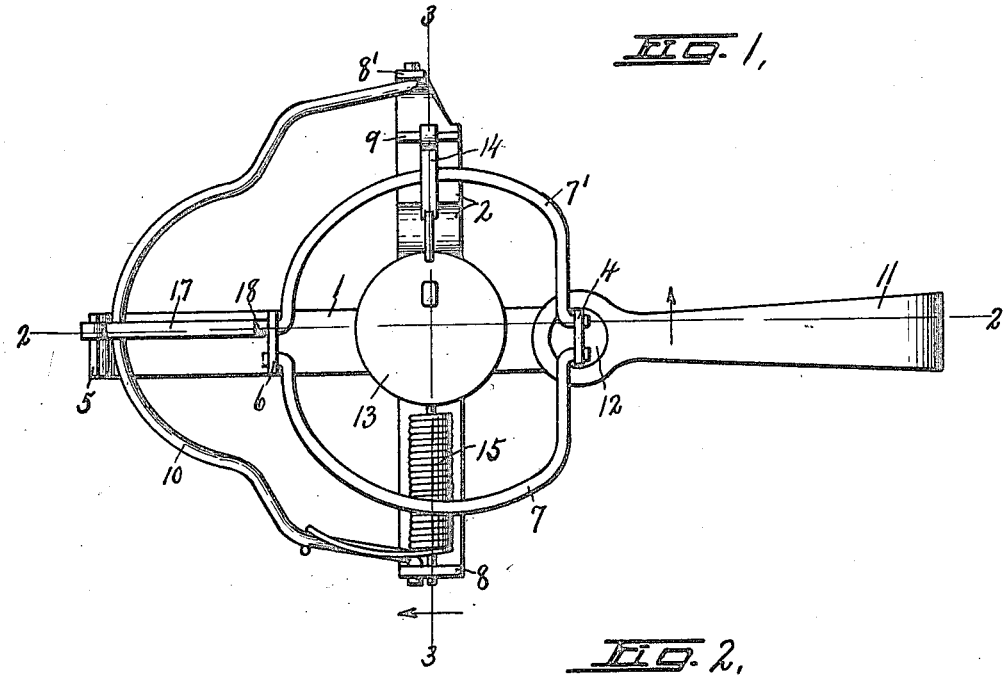
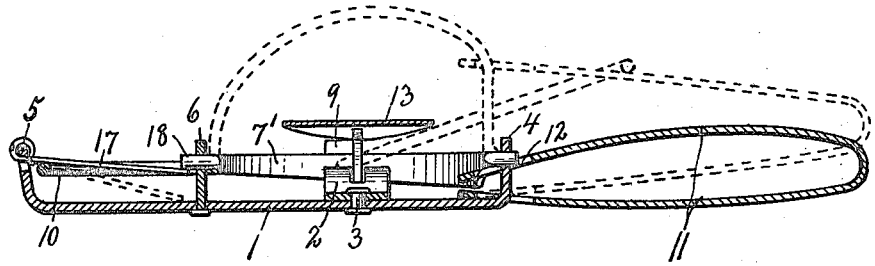
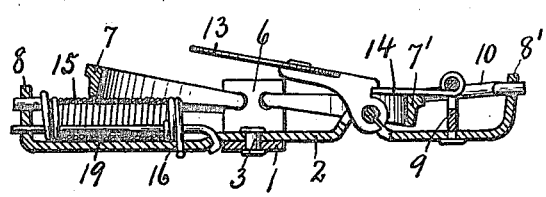
WITNESS
INVENTOR
BY
ATTORNEYS Patented Apr. 9, 1929.

1,708,149

UNITED STATES PATENT OFFICE.

MILFORD J. NEWHOUSE, OF ONEIDA, NEW YORK, ASSIGNOR, BY MESNE ASSIGNMENTS, TO ANIMAL TRAP COMPANY OF AMERICA, OF LITITZ, PENNSYLVANIA, A CORPORATION OF PENNSYLVANIA.

ANIMAL TRAP.

Application filed May 8, 1924. Serial No. 711,832.

This invention relates to an animal trap involving the use of a frame composed of cross bars secured together at their crossing and extending some distance beyond the same for receiving and supporting a pair of jaws and a striker arm, together with operating means and holding means for said jaws and striker bar.

One of the objects is to pivot the jaws to one of the bars at opposite sides of the crossing and to pivot the striker bar to the other frame bar at opposite sides of the crossing for compactness and convenience of setting both the jaws and striker bar.

Another object is to enable the striker bar to be moved from a position at one end to a position at the opposite end of the jaws or at right angles to the pivotal axes thereof for cramping the animal by the jaws and effecting a more instantaneous relief from suffering.

Another object is to utilize the upper side of the actuating spring for the jaws as a stop for limiting the movement of the striker bar when released.

Other objects and uses relating to specific parts of the trap will be brought out in the following description.

In the drawings:—

Figure 1 is a top plan of an animal trap embodying the various features of my invention, the movable parts being shown in position for setting the trap.

Figure 2 is a longitudinal sectional view taken on line 2—2, Figure 1, the dotted lines indicating the closed position of the jaws and striker arms.

Figure 3 is a transverse sectional view taken on line 3—3, Figure 1.

As illustrated, the supporting frame of the trap is composed of bars —1— and —2— crossing each other at right angles and secured together at the crossing by rivets —3— to hold them in rigid relation, both bars being extended some distance beyond the crossing.

The bar —1— is provided with upturned end lugs —4— and —5— and an intermediate lug —6—, the lugs —4— and —6— being disposed equal distances from and at opposite sides of the bar —2— and are provided with suitable apertures in which are pivoted a pair of cooperative jaws —7— and —7'— to swing about axes parallel with the longitudinal center of the bar —1— and therefore, at right angles to the longitudinal center of the bar —2—.

The bar —2— is also provided with upwardly projecting end lugs —8— and —8'— and an intermediate lug —9—, the lug —8— being located at one side of the crossing of the bars —1— and —2— while the lugs —8'— and —9— are located at the opposite side of said crossing.

The lugs —8— and —8'— are provided with suitable apertures for receiving the opposite ends of a striker bar —10— and permitting said bar to rock about an axis at right angles to that of the jaws —7— and —7'— or lengthwise of the jaws from a position at one end to a position at the opposite end thereof, the central portion of the striker bar —10— being arched outwardly a sufficient distance to permit it to clear the jaws —7— and —7'— when rocked from one extreme position to another and to assume a position between the lugs —5— and —6— when set against the action of its retracting spring presently described.

A U-shaped leaf spring —11— has one of its arms hinged to the lug —4— to swing vertically and horizontally and the corresponding end of the other arm is provided with an opening —12— to permit it to be compressed toward the first named arm around the lug —4— and also to allow its side walls to engage the outer edges of the adjacent ends of the jaws —7— and —7'— for closing the latter when released.

The jaws may be held in their open positions by the usual means releasable by the animal and consisting, in this instance, of a bait pan —13— and a detent —14—, the bait pan being hinged to the frame bar —2— at a point between the crossing of the frame bars and the path of movement of the central portion of the jaw —7'— when opened while the detent —14— is hinged to the lug —9— at a point between the path of movement of the jaw —7— and adjacent lug —8'— and is extended across the upper face of the open jaw —7'— and engaged with the heel of the platform —13— to hold the jaws in their open positions.

A coil spring —15— is mounted on the bar —2— between the crossing of said bars —1— and —2— and the lug —8— so as to extend lengthwise of the bar —2— at the side of the bar —1— opposite that at which the detent —14— is located and directly under the open jaw —7—.

The inner end of the spring —15— is interlocked in an aperture —16— in the frame bar —2— near the cross bar —1— while the outer end of the same spring is extended laterally and interlocked with the striker bar —10— some distance from its pivotal connection with the lug —8— for rocking said striker bar from a set position at one end to a position at the opposite end of the jaws —7— and —7'— or lengthwise of said jaws.

The means for holding the striker bar —10— in its set position consists of a detent —17— having one end hinged to the lug —5— and its other end extended across the upper face of the striker bar —10— when the latter is set and engaged with an extension —18— of the adjacent pintle of the jaw —7'—, the hinge connection between the detent —17— and lug —5— being sufficiently loose to allow the free end of the detent to be moved laterally into and out out engagement with the pintle extension —18—, particularly when the jaws —7— and —7'— are set in their open positions.

The object in engaging the detent —17— with the pintle extension —18— is to defer the action of the striker bar —10— by its spring —15— until after the jaws —7— and —7'— begin to close to assure the trapping of the animal before causing it to be struck by the striker bar —10—.

The upper leaf of the spring —11— is disposed in the path of movement of and forms a limiting stop for the striker bar —10— when the latter is released as indicated by dotted lines in Figure 2.

A retaining rod —19— is inserted through the spring —15— and has one end engaged with the frame —2— near the cross bar —1— and its other end engaged with the lug —8— for holding it in operative position.

The relative arrangement of the various parts of the trap as described are particularly simple and afford a free action of the jaws and striker bar both in setting and releasing, and contribute materially to the efficiency of the trap in catching and relieving the animal from suffering and at the same time preserving the hide and fur against undue mutilation. When the trap is set and subsequently released by the depression of the bait pan —13— by the animal, the detent —14— will be tripped to allow the closing of the jaws —7— and —7'— by the spring —11— and this closing of the jaws will cause the extension —18— to shift the free end of the detent —17— laterally out of engagement therewith for releasing the same and permitting the operation of the striker bar —10— by its spring —15— thereby assuring the trapping of the animal in advance of its being struck and numbed by the striker bar —10— which also cramps the animal in the jaws and reduces the liability of its escape therefrom.

What I claim is:

An animal trap comprising a bottom plate, cooperative jaws having end pintles journaled in the bottom plate, a spring for closing the jaws, a cross bar fixed to the bottom plate, a striker bar journaled in the opposite ends of the cross bar to swing about an axis normal to the axes of the jaws from a position at one end to a position at the other end of said jaws, a spring for operating the striker bar positioned on the cross bar between a journaled end of the striker bar and the bottom plate, a detent pivotally mounted on the cross bar in spaced relation to the other journaled end of the striker bar, a movable platform mounted on the bottom plate for coaction with the detent whereby the jaws are held open against the action of their spring, and a second detent pivotally mounted on the end of the bottom plate and movable into and out of engagement with a pintle of a jaw for holding the striker bar against the action of its spring.

In witness whereof I have hereunto set my hand this twenty-ninth day of April, 1924.

MILFORD J. NEWHOUSE.